United States Patent Office 2,749,139
Patented June 5, 1956

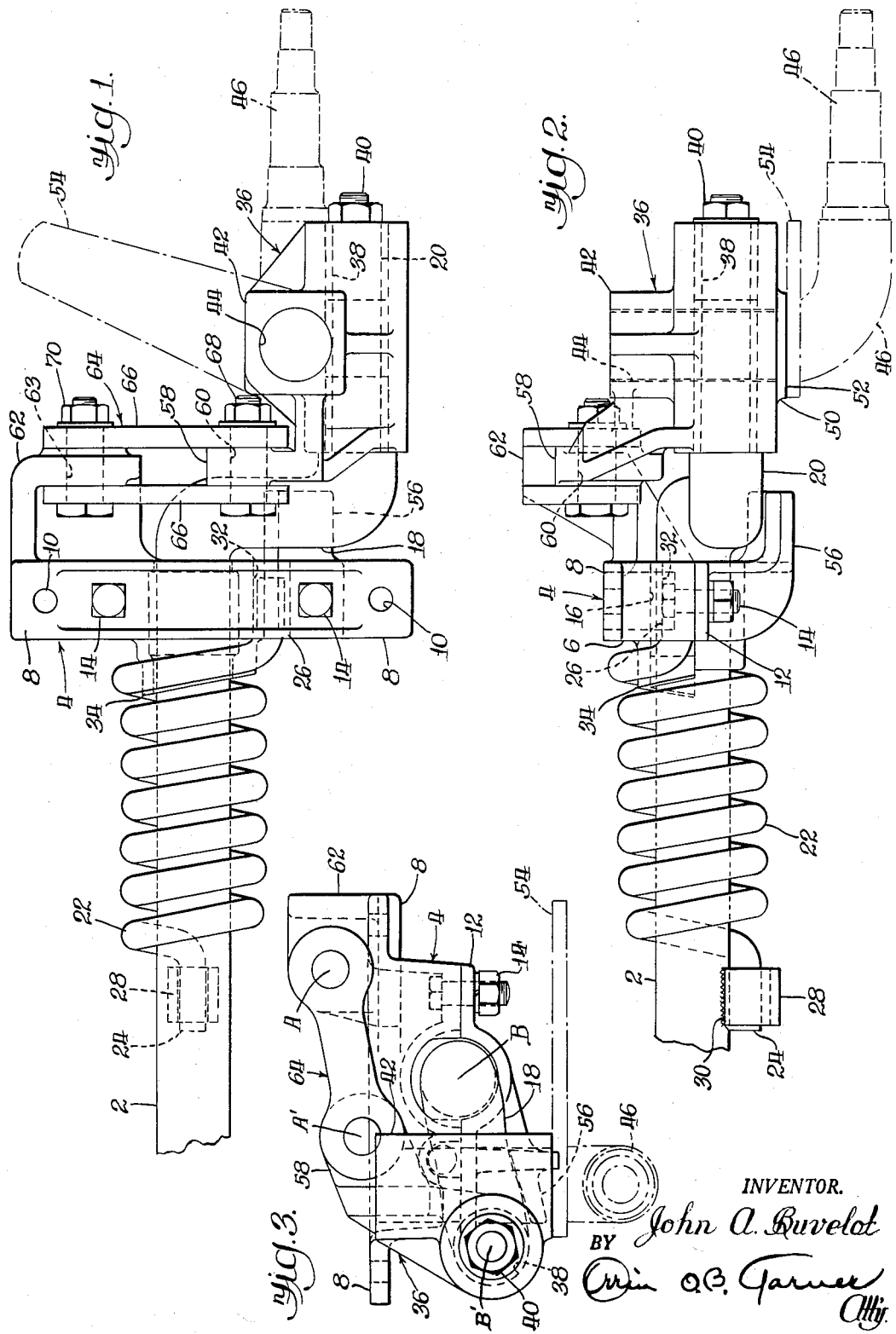
June 5, 1956 — J. A. BUVELOT — 2,749,139
SPRING MOUNTING ASSEMBLY FOR STEERABLE WHEELS
Filed Feb. 12, 1953
INVENTOR.
John A. Buvelot
BY
Atty.

2,749,139

SPRING MOUNTING ASSEMBLY FOR STEERABLE WHEELS

John A. Buvelot, Chicago, Ill., assignor to American Steel Foundries, Chicago, Ill., a corporation of New Jersey Application February 12, 1953, Serial No. 336,494

3 Claims. (Cl. 280—96.2)

My invention relates to axle assemblies and more particularly to axles known as the "trail type" and to a novel steering arrangement incorporated therewith.

It is a general object of my invention to provide a novel steering arrangement to be associated with the trail type axle assembly.

It is a further object of my invention to provide a spindle supporting casting attachable to an eccentric shaft of a trail type axle.

These and other objects of my invention will become apparent in the course of the following description and from an examination of the concerned drawings, wherein:

Figure 1 is a plan view of my novel axle assembly;

Figure 2 is a side elevational view of the showing of Figure 1, and

Figure 3 is an end elevational view of the showing of Figure 1.

In describing my invention, it will be noted that Figures 1 and 2 illustrate only one half of my axle assembly, such a showing being deemed sufficient inasmuch as the structure illustrated is duplicated at the opposite end thereof.

The disclosed assembly comprises a main axle or shaft 2 which is journaled adjacent its end in a bracket 4, said bracket affording means to attach the assembly to the underside of a related vehicle body (not shown), such as a trailer. The bracket 4 consists of a base 6 having wings 8 with holes 10, whereby the base may be bolted to the underside of said body. A cap 12 is secured to the base in any suitable manner, for example, by the bolts 14. The cap and base together define an opening 16 extending transversely of the bracket which provides for the bushed reception of the main shaft 2.

Immediately outboardly of the bracket a crank or crank arm 18 extending generally transversely of the shaft 2, may be connected to said shaft and is preferably formed integral therewith. A shaft or trunnion 20 is connected to the end of the crank 18 remote from the shaft 2 and is preferably integrally formed with the crank 18. The shaft 20 is positioned so as to be substantially parallel to and spaced from or trailing the main shaft.

A spring 22, preferably a coiled helical spring, is sleeved over the shaft 2 immediately inboardly of the bracket 4. Opposite ends of the spring 22 are formed as substantially straight portions 24 and 26 extending parallel to the longitudinal axis of the main shaft 2. The end portions 24 and 26 provide means whereby the spring may be respectively secured to the main shaft 2 and to the bracket 4. A spring clip 28 is fixed to the shaft 2 in any suitable manner, for example, by welding as at 30, said clip receiving the end 24 of the spring 22, thereby attaching said spring to the shaft. The bracket 4 is provided with a substantially cylindrical opening or recess 32 which receives the end 26 of said spring.

It will also be noted that the bracket 4 is provided with a shelf 34 on the inboard side thereof, said shelf being of semi-cylindrical form to partially surround the shaft 2 and to telescope within the first coil of the spring 22, immediately adjacent the spring end 26. In this position the shelf 34 supports a segment of the inside diameter of said first coil and thereby acts as a fulcrum during the spring action hereinafter described.

As noted above, the shaft 20 extends outboardly from the end of the crank 18 whereat it presents a reduced diameter bearing portion. A spindle mounting cast member 36 having a bushed horizontal bore 38 pivotally receives the bearing portion of the shaft 20, the cast member being retained on said shaft by the washer-nut assembly shown at 40.

The cast member 36 also presents an integrally formed housing 42, said housing defining a vertical cylindrical bore 44 immediately adjacent and substantially perpendicular to the bore 38. The bore 44 provides bushed and pivotal reception for an upper vertical portion of a wheel mounting spindle, here shown in phantom at 46. It will be seen that the outer horizontal portion of the spindle is designed to accommodate a conventional cup-cone bearing assembly (not shown), whereby a conventional wheel may be rotatably mounted thereon.

At the lower end of the housing 42 a boss 50 is formed surrounding the bore 44, said bore presenting a horizontal substantially flat bearing surface 52. A horizontally disposed arm 54 is integrally formed with the upper vertical portion of the spindle 46 in such a manner as to engage the surface 52 and thereby limiting the disposition of the vertical portion of the spindle 46 within the bore 44. The arm 54 also extends rearwardly and substantially transversely of the horizontal portion of the spindle 46, thus providing a mechanical advantageous lever whereby the spindle 46 may be rotated or pivoted about the central vertical axis of the bore 44. The rearward end or lever of the arm 54 may be attached, together with the like lever of the axle assembly on the opposite end of the axle (not shown), to a conventional steering linkage whereby the wheels (not shown) may be turned and the direction of motion of the associated vehicle controlled.

As the axle is located, for example, by loading the supported vehicle (not shown), the main shaft 2 is pivoted in the bearing bracket 4 and the trunnion 20, together with the associated cast member 36 and spindle 46, are carried arcuately about the longitudinal axis of the main shaft 2. Because the opposite ends of the springs 22 are respectively secured to the shaft and bracket, the pivoting action of the shaft 2 is resiliently resisted by the flexible bending of the coiled spring 22. It should also be noted that in the assembled and unloaded position the spring 22 is secured to the shaft with a slightly preset bending movement induced therein. Thus, spring action in the unloaded condition causes the crank 18 to seat on the stop 56 which is integrally formed with the cap 12 of the bracket 4.

As the above described loading in arcuate motion of the cast member 36 occurs, provision must be made to maintain the cast member and more particularly the bore 44 in a substantially vertical position. This positive vertical position is necessary to prevent binding of the vertical portion of the spindle 46 which would render the steering or pivoting of the spindle in said bore 44 extremely difficult. Structure accommodating this function will now be described.

An arm 58 is attached to the cast member 36, said arm preferably being formed integrally with said cast member on the side thereof adjacent the bracket 4. A pivot hole 60 is provided in the arm, said hole extending parallel to the bore 38. Rigidly secured to the base 6 of the bracket 4 and on the outboard side thereof is a lug 62 formed with a pivot hole 63 in parallel arrangement to the shaft hole 60 of the arm 58. A link 64, herein shown as a pair of plates 66, 66, interconnects and is pivotally attached to the arm 58 and lug 62 by means of the bolt assemblies 68 and 70.

Referring now to Figure 3, it will be seen that the link 64, the crank 18, the bracket 4 and the cast member 36 form a variable parallelogram linkage that maintains bore 44 in the cast member 36 in a vertical position as the crank 18 moves arcuately about the axis of the main shaft 2. Diagrammatically, the variable parallelogram may be denoted by the legs A—A′, B—B′, and A—B, A′—B′. In the preferred embodiment the parallelogram is shown to be equilateral; however, it is only necessary that the opposite legs of said parallelogram be equalled. Thus, the linkage parallelogram serves to maintain the bore 44 in the cast member 36 in a vertical position during the above described loading and the resulting arcuate motion of the crank 18.

I claim:

1. In a trail type axle assembly for resiliently supporting a highway vehicle, a main shaft, a bearing bracket journally receiving said main shaft, a coil spring sleeved over the shaft inboardly of the bracket and having its opposite ends secured to the shaft and bracket respectively, a crank on one end of the main shaft integrally formed therewith outboardly of the bracket and disposed to extend transversely of said main shaft, another shaft integrally formed with said crank on the end thereof remote from the main shaft, said other shaft being disposed to parallel the main shaft, a cast member having a bore therein receiving said other shaft whereby the member is journally mounted on said other shaft, another bore in said cast member in perpendicular relation to the first mentioned bore and disposed on one side thereof as seen in the plan view, an arm on the cast member extending upwardly therefrom and inboardly thereof, a lug on the bracket located above and to one side of the journal connection between the bracket and the main shaft, a link having its opposite ends pivotally connected to the lug and the arm respectively, a spindle member having angularly related segments, one of said segments being pivotally disposed in said other bore, and the other of said segments being arranged to rotatably mount an associated wheel, and steering means associated with the spindle member.

2. A trail type axle assembly according to claim 1, wherein said other bore is located forwardly of the first mentioned bore when the assembly is viewed in end elevation.

3. A trail type axle assembly according to claim 2, wherein said steering means comprises a steering arm fixedly attached to the spindle member immediately below said cast member, said steering arm extending forwardly of the assembly as seen in plan view.

References Cited in the file of this patent

UNITED STATES PATENTS

| | | |
|---|---|---|
| 2,023,254 | Stimson | Dec. 3, 1935 |
| 2,117,590 | Armstrong | May 17, 1938 |
| 2,176,971 | Klotsch | Oct. 24, 1939 |
| 2,351,291 | Ross | June 13, 1944 |
| 2,426,513 | Linn | Aug. 26, 1947 |
| 2,559,142 | Woodworth | July 3, 1951 |